(12) United States Patent
Nicholson

(10) Patent No.: US 7,569,771 B2
(45) Date of Patent: Aug. 4, 2009

(54) ELECTRICAL RECEPTACLE AND BOX APPARATUS

(76) Inventor: Andrew Nicholson, 3932 Jean Lafitte Pkwy., Chalmette, LA (US) 70043

( * ) Notice: Subject to any disclaimer, the term of this patent is extended or adjusted under 35 U.S.C. 154(b) by 7 days.

(21) Appl. No.: 11/903,840

(22) Filed: Sep. 25, 2007

(65) Prior Publication Data
US 2008/0087452 A1  Apr. 17, 2008

Related U.S. Application Data

(60) Provisional application No. 60/829,053, filed on Oct. 11, 2006.

(51) Int. Cl.
*H02G 3/08* (2006.01)
*H01R 13/46* (2006.01)

(52) U.S. Cl. .............. 174/58; 174/57; 174/53; 174/481; 220/3.2; 220/3.3

(58) Field of Classification Search .......... 174/480, 174/481, 50, 53, 57, 58, 59; 220/3.2–3.9, 220/4.02; 439/535, 724; 248/906
See application file for complete search history.

(56) References Cited

U.S. PATENT DOCUMENTS

| | | | | |
|---|---|---|---|---|
| 1,938,309 A | * | 12/1933 | Williams | 174/58 |
| 2,397,688 A | * | 4/1946 | Osinski | 174/53 |
| 2,433,917 A | * | 1/1948 | McCartney | 174/53 |
| 2,828,394 A | * | 3/1958 | Mayzik | 174/59 |
| 2,908,743 A | * | 10/1959 | Premosshis | 174/53 |
| 3,038,141 A | * | 6/1962 | Chiuchiolo | 174/53 |
| 3,609,647 A | * | 9/1971 | Castellano | 174/53 |
| 3,716,651 A | * | 2/1973 | Werner | 174/53 |
| 3,879,101 A | | 4/1975 | McKissic | |
| 3,922,478 A | * | 11/1975 | Perkey | 174/53 |
| 4,165,443 A | | 8/1979 | Figart | |
| 4,842,551 A | | 6/1989 | Heimann | |
| 5,399,806 A | * | 3/1995 | Olson | 174/53 |
| 5,525,754 A | | 6/1996 | Akins | |
| 6,361,333 B1 | | 3/2002 | Cash | |
| 6,617,511 B2 | | 9/2003 | Schultz | |
| 6,786,766 B1 | * | 9/2004 | Chopra | 439/535 |
| 6,870,099 B1 | | 3/2005 | Schultz | |
| 6,939,179 B1 | | 9/2005 | Kieffer | |
| 6,945,815 B1 | * | 9/2005 | Mullally | 439/535 |
| 7,034,222 B1 | | 4/2006 | York | |
| 7,425,677 B2 | * | 9/2008 | Gates et al. | 174/50 |

* cited by examiner

*Primary Examiner*—Angel R Estrada
(74) *Attorney, Agent, or Firm*—Juan J. Lizarraga

(57) ABSTRACT

An electrical receptacle and junction box apparatus including a stud mounted electrical junction box with stud-attaching screw shoulders having wire apertures with retaining screws and retaining screw fittings for each wire aperture for receiving electrical wiring without wrapping the wiring around screws, a ground strip, a slide-in receptacle or slide-in switch received in the electrical junction box, an electrical connection between the electrical junction box and the slide-in receptacle or slide-in switch unit with elongated prongs, slotted terminals with slot apertures to allow the slide-in receptacle or slide-in switch to move in and out of the electrical junction box and non-conductive bases for embedding the terminals, the ground strip and the retaining screw fittings.

8 Claims, 13 Drawing Sheets

ELECTRICAL RECEPTACLE AND BOX APPARATUS

This application claims priority from U.S. Provisional Application Ser. No. 60/829,053 ("the '053 application") filed Oct. 11, 2006. The '053 application is incorporated here by reference.

BACKGROUND OF THE INVENTION

The present invention relates generally to electrical wiring systems and devices; and more particularly to an improved wireless electrical receptacle and electrical junction box apparatus which is safer, easier to install and replace and more cost effective and efficient to manufacture than conventional wired electrical receptacles.

The problems related to wiring electrical receptacles, including wall outlets, switches, and similar applications have been well documented. Aside from the costs associated with new construction involving the costs of an electrician and a drywall or plaster technician, there are certain difficulties associated with the repair and replacement of electrical receptacles and occasionally junction boxes.

Replacement of a conventional receptacle requires that the electrical power to the receptacle be turned off, and all electrical wires be detached before the old receptacle can be removed from the junction box. Replacement requires that the wires be reshaped and reattached to the new receptacle and then squeezed back into the junction box with the chance that one of the wires might break from being bent too much.

In the event that a junction box must be replaced, this usually means breaking a part of the sheetrock or drywall for access to the box, detaching the wires from the receptacle, pulling the wires out of the junction box, installing a new box, reshaping and sneaking the wires into the new box, reshape the wires again onto the receptacle and squeezing them in place, also with the chance of breakage. The drywall must then be repaired with cutting, installing, taping, floating, sanding, priming, painting and all the mess that goes with it.

Several inventions have sought to overcome these problems, including: U.S. Pat. No. 6,939,179 which discloses an electrical box that is secured to a stud and is pre-wired to allow a receptacle or switch to be plugged in; U.S. Pat. Nos. 6,617,511 and 6,870,099 which disclose electrical boxes that are pre-wired from the outside and allow switches or receptacles to be plugged in; U.S. Pat. No. 4,165,443, which discloses an electric box that is electrified from the outside that allows receptacles or switches to be plugged in; and U.S. Pat. No. 6,361,333, which discloses a plug-in electrical junction box.

The foregoing inventions teach very intricate and complicated solutions that do not offer the simplicity of manufacture, safety and ease of installation found in the present invention.

SUMMARY OF THE INVENTION

In accordance with the present invention, an improvement on existing electrical receptacles and junction boxes is disclosed, which is safer, easier to install and replace, and more cost effective to manufacture without compromising quality.

While the invention generally applies to an electrical receptacle unit or wall outlet unit, it is also intended to apply to light switches, rheostats, circuit breakers, and similar devices, since all of them will fit in the same electrical junction boxes.

It is a general object of this invention to provide an electrical receptacle and junction box apparatus comprising a stud mounted electrical junction box with stud-attaching screw shoulders having wire apertures with retaining screws and retaining screw fittings for each wire aperture for receiving electrical wiring without wrapping the wiring around screws, a ground strip, a slide-in receptacle or slide-in switch received in the electrical junction box, an electrical connection between the electrical junction box and the slide-in receptacle or slide-in switch unit comprising elongated prongs, slotted terminals with slot apertures to allow the slide-in receptacle or slide-in switch to move in and out of the electrical junction box and non-conductive bases for embedding the terminals, the ground strip and the retaining screw fittings.

DETAILED DESCRIPTION OF THE INVENTION

Figure 1:
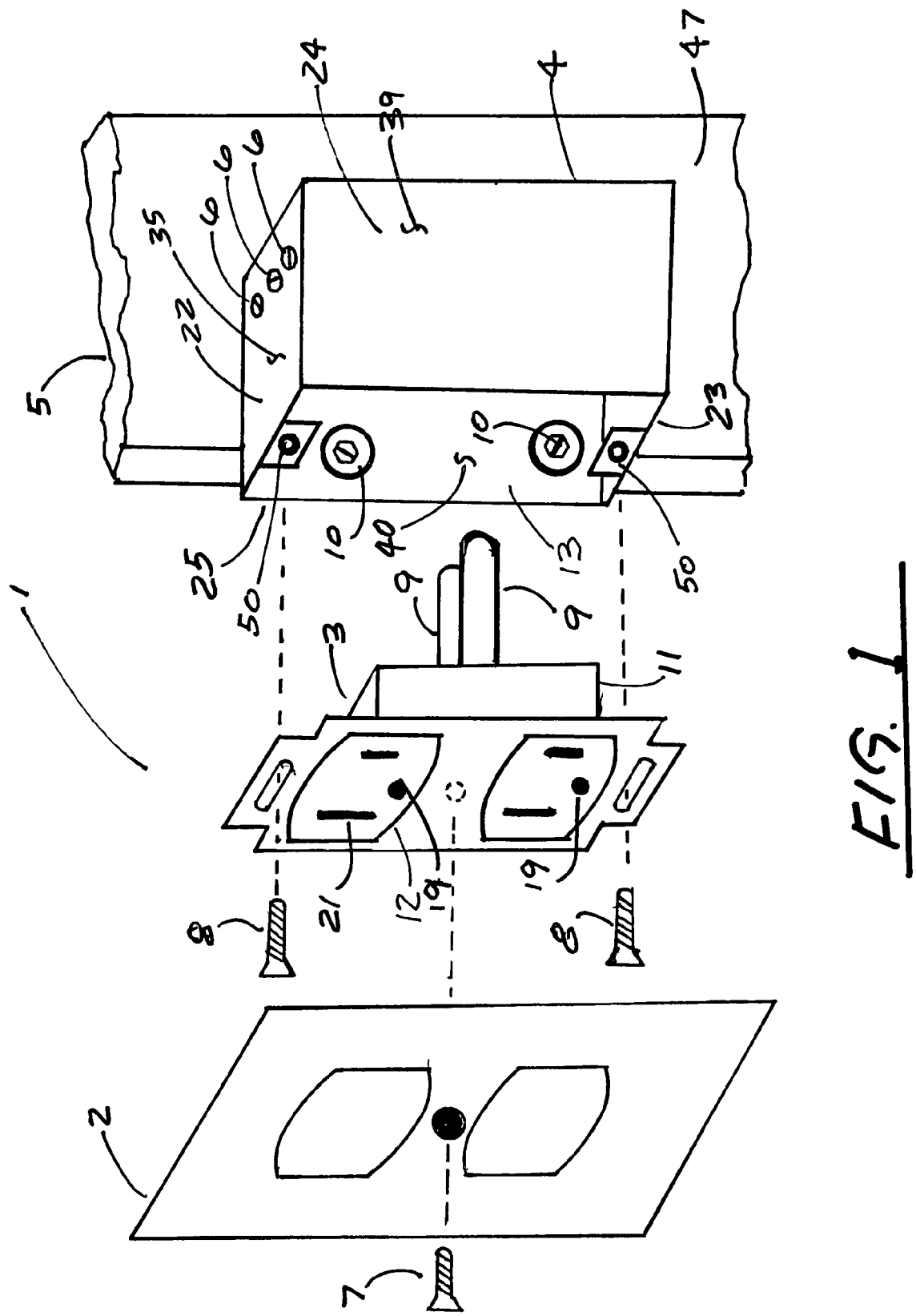
FIG. 1 is an exploded view of the inventive electrical receptacle and junction box apparatus.

FIG. 1 depicts an exploded view of the inventive electrical receptacle and junction box apparatus 1 showing a slide-in receptacle 3 in position for insertion or removal from a junction box 4 fixedly attached to a building stud 5 by means of two stud attaching screws 10. Receptacle screws 8 hold the slide-in receptacle 3 in place in the junction box 4. The receptacle screws 8 attach to ground strip tabs 50 as more fully shown in FIG. 6. A typical faceplate 2 covers the slide-in receptacle 3 and is held in place by a faceplate screw 7.

The slide-in receptacle 3 has a typical socket face 12 with electrical plug apertures 21 and ground plug openings 19. Also shown is a non-conductive electrical base 11 with rearward extending elongated prongs 9. While a slide-in receptacle 3 is shown, it is intended that other devices normally installed in wall junction boxes such as light switches and dimmers could be similarly adapted and fitted with a non-conductive electrical base 11 with rearward extending elongated prongs 9 in keeping with the objects of this invention.

As shown in FIG. 1, the junction box 4 has an opening 13 defined by an upper side 22, a lower side 23, a left side 25 and a right side 24. Although not visible in FIG. 1, the junction box 4 has a rear side 26. Although only partially visible in FIG. 1, but as will be more fully shown in FIGS. 4, 5, 6, 10, 12 and 14, the upper side 22 has an inner surface 34 and an outer surface 35. The right side 24 has an inner surface 38 and an outer surface 39. The left side 25 has an inner surface 40 and an outer surface 41. The lower side 23 has an inner surface 36 and an outer surface 37. The rear side 26 has an outer surface 43 and an inner surface 42.

Retaining screws 6 for attachment to the electrical power supply are shown on the outer surface 35 of the upper side 22, and while not visible in FIG. 1, retaining screws 6 are similarly placed on the outer surface 37 of the lower side 23.

As depicted in FIG. 1, the junction box 4 is fixedly attached to a building stud 5 by means of two stud-attaching screws 10 with the left side 25 adjacent to the building stud 5 and the outer surface 41 of the left side 25 in contact with a right side face 47 of the stud 5. Although not depicted, the junction box 4 can be similarly fixedly attached to the left side face 49 of the building stud 5 by simply inverting the junction box 4. As will be more fully described below, the upper side 22 and the lower side 23 are identical and will function interchangeably whether the junction box 4 is fixedly attached to the right side face 47 or the left side face 49.

Figure 5:
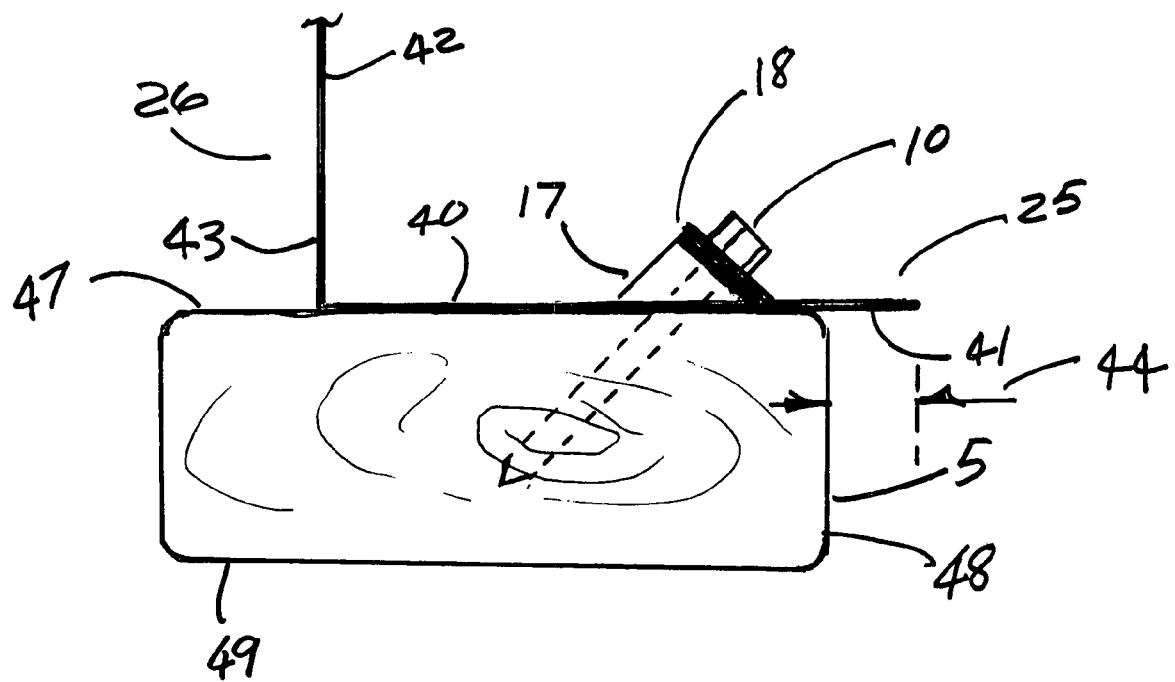
FIG. 5 is a cross sectional top view of side of inventive electrical junction box in contact with stud showing placement of stud attaching screw.

As shown in FIG. 5, stud attaching screw shoulders 17 are provided on one vertical side of the junction box 4. In FIG. 1, these screw shoulders 17 and stud attaching screws 10 are shown on the left side 25 of the junction box 4 and the junction box 4 is fixedly attached to the right side face 47 of the stud 5. If desired to fixedly attach the junction box 4 to the left face side 49 of the stud 5, the junction box 4 need only be inverted, in which case the screw shoulders 17 would be adjacent to the left side face 49 of the stud and the stud attaching screws 10 are simply driven from the side of the junction box 4 adjacent to the stud 5. If the junction box 4 was inverted, the upper side 22 as shown in FIG. 1 would become the lower side 23 and vice versa. Similarly, the right side 24 as should in FIG. 1 would become the left side 25 and vice versa. It is understood that the designations of right, left, upper and lower refer to the placement of the junction box 4 in a wall and the junction box 4 will function in exactly the same way whether mounted on the right or left side of a stud 5 and no modification is required.

As also shown in FIG. 1 and more fully depicted in FIG. 5, the stud attaching screws 10 are driven at an angle through the junction box opening 13. In this way, the stud attaching screws 10 are accessible without the necessity of disturbing or destroying finished wall treatment such as drywall or plaster. Likewise, while typical screws are depicted, it is not intended that any specific fastener or driver be used to fixedly attach the junction box 4 to the stud 5. Any suitable fastener whether driven by screwdriver, nut driver would suffice.

Figure 2:
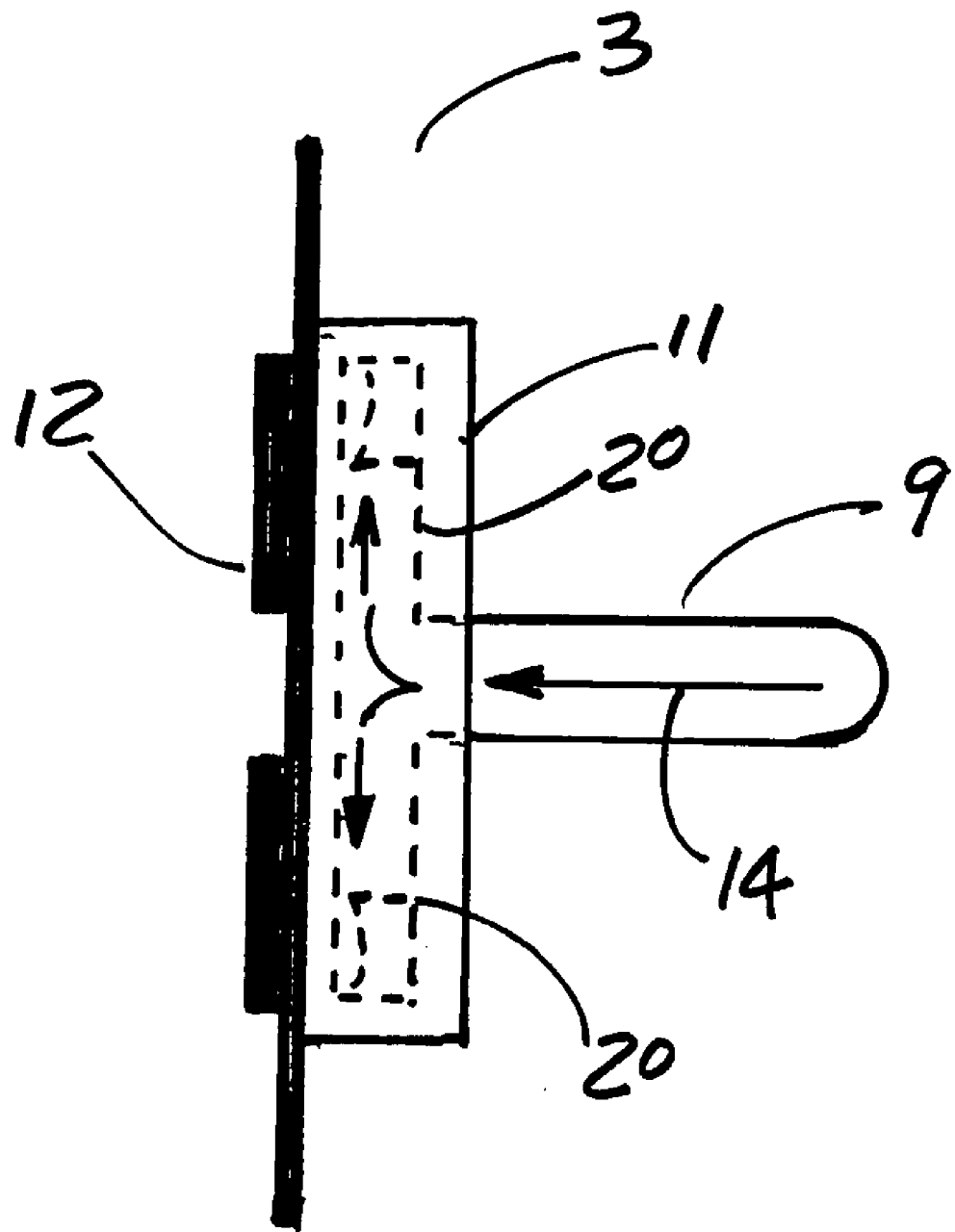
FIG. 2 is a side of the inventive slide-in receptacle.

FIG. 2 shows a side view of the inventive slide-in receptacle 3, with a non-conductive receptacle base 11, and a typical socket face 12. Unlike a conventional double receptacle, which has screws to attach the electrical wires, the inventive slide-in receptacle 3 has two elongated prongs 9, eliminating intricately shaped metal parts, screws and tangled up wires. The dashed lines indicate the shape of prong flanges 20 imbedded in the non-conductive receptacle base 11. The elongated prongs attached to the prong flanges 20 extend from the back of the non-conductive receptacle base 11 which allows for movement of the slide-in receptacle 3 in and out of the junction box 4 to accommodate wall thickness from 0" up to 1" if not more.

The elongated prongs 9 also allow for vertical adjustment.

In FIG. 2, the arrows 14 indicate current flow. Since both of the prong flanges 20 with their elongated prongs 9 are imbedded in the non-conductive receptacle base 11, they now constitute an integral part of it, and from now on they will function as one integrated part, the slide-in receptacle 3 which is a "Wireless Receptacle."

Figure 3:
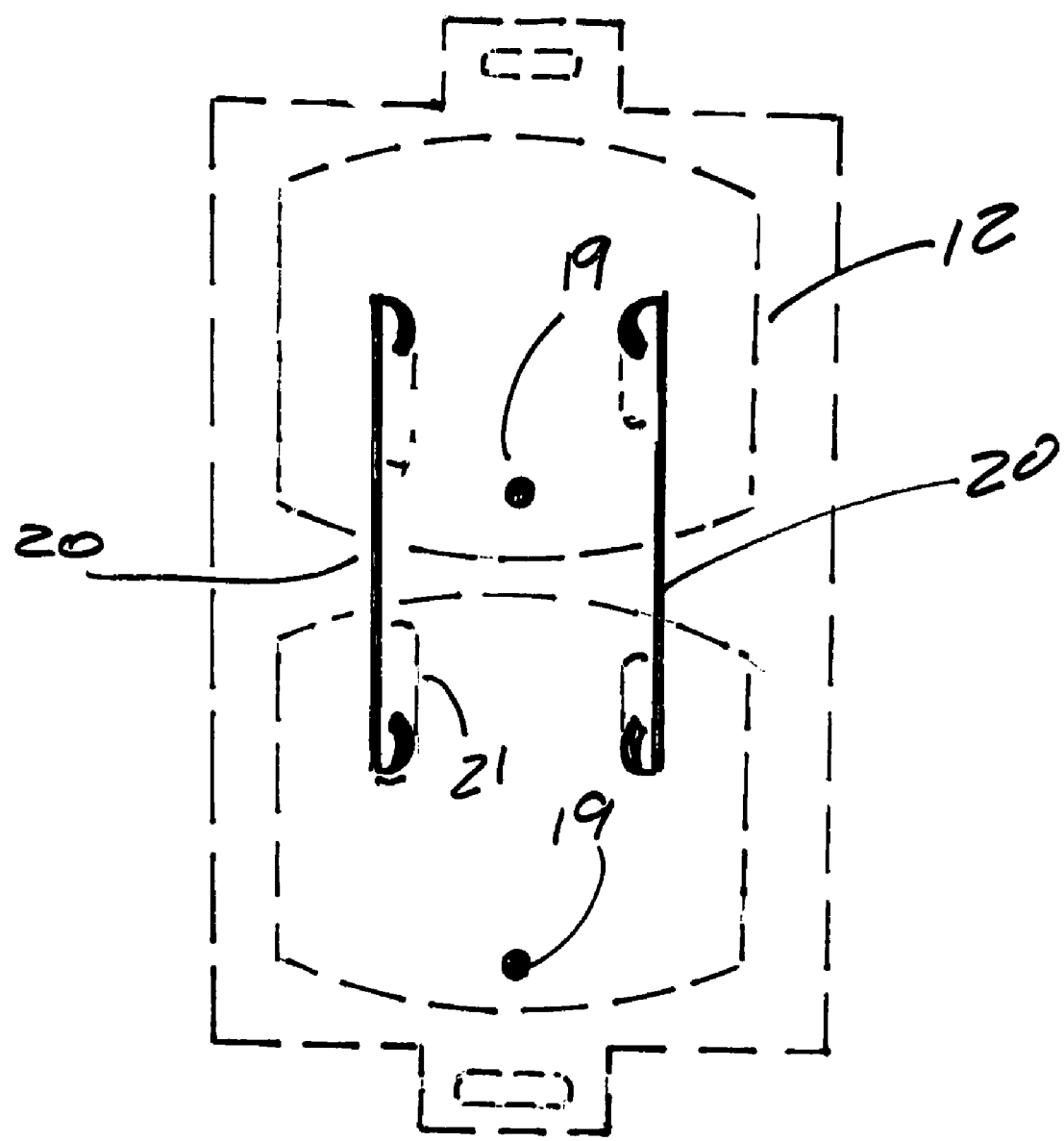
FIG. 3 is a front view of the prongs imbedded in the inventive slide-in receptacle.

FIG. 3 provides a front view of the prong flanges 20 as imbedded in the non-conductive receptacle base 11. For clarity, a typical socket face 12 is shown in dashed lines superimposed over the front view of the prong flanges 20. Also shown are typical electrical plug apertures 21 and ground plug openings 19. As apparent from this view, an electrical plug inserted into a set of electrical plug apertures 21 will engage the prong flanges 20 to establish an electrical connection to provide electrical power to the device connected to the electrical plug. As more fully described below, the socket face 12 will also serve as a ground connection.

Figure 4:
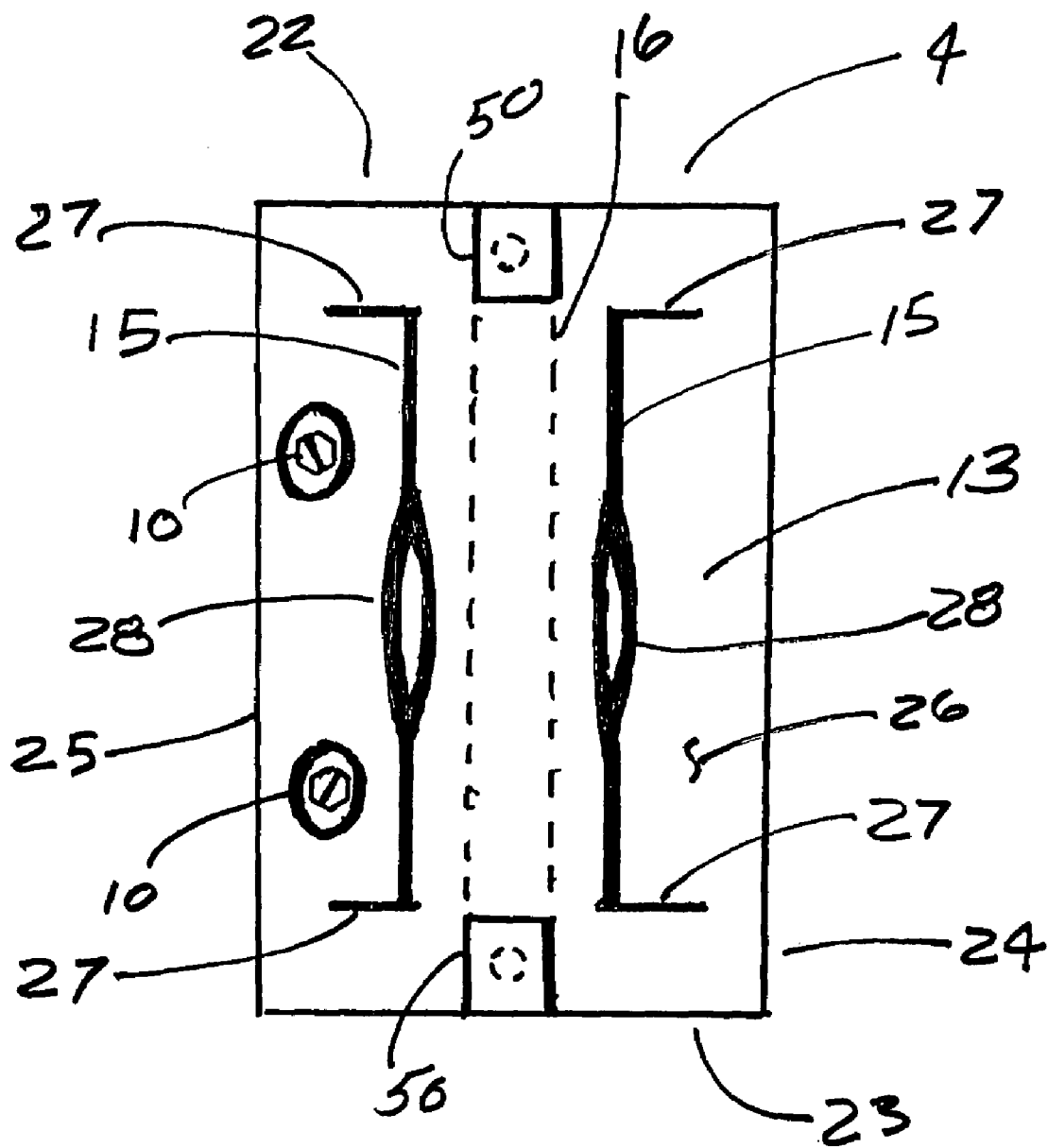
FIG. 4 is a front view of the inventive electrical junction box.

FIG. 4 shows a front view of the junction box 4 looking into the junction box opening 13. In this view the rear side 26 of the junction box 4 can be seen, along with the stud attaching screws 10. Although not shown, with the junction box 4 in this position, the stud 5 would be on the left hand side in contact with the left side 25 of the junction box 4.

Also shown in FIG. 4 are two terminals 15, each with a terminal slot aperture 28, intended to receive the elongated prongs 9 of the slide-in receptacle 3. As depicted in FIG. 1, the slide-in receptacle 3 would be held in place with receptacle screws 8 placed through the socket face 12 and inserted in the ground strip tabs 50 at each end of the ground strip 16, shown in dashed lines. At the ends of each terminal 15 are terminal tabs 27. While not shown in FIG. 4, it is intended that the terminal tabs 27 and the ground strip 16 be imbedded in non-conductive material in proximity to the rear side 26 of the junction box 4 where the rear side 26 meets the upper side 22 and the lower side 23 of the junction box 4.

FIG. 5 depicts a cross sectional top view of the left side 25 of the junction box 4 in contact with a stud 5 showing placement of one of the stud attaching screws 10. This view would be identical for either of the stud attaching screws 10. As shown, the outer surface 41 of the left side 25 of the junction box 4 is in contact with the right side face 47 of the stud 5. As previously noted, by inverting the junction box 4, installation could be made on the left side face 49 of the stud 5.

In FIG. 5, the left side 25 of the junction box 4 extends beyond the front face 48 of the stud 5 by an amount 44 indicated by arrows. The amount of this extension depends on the thickness of the wall covering such as drywall. Because junction boxes 4 are installed before walls are closed in, it is normal to extend the boxes beyond the studs 5 to allow for finished wall thickness. It is also intended that the rearward extending elongated prongs 9 of the slide-in receptacle 3 would compensate for variations in wall thickness not addressed by the extension 44 of the junction box 4 beyond the front face of the stud 48.

As previously shown in FIG. 1, the stud attaching screws 10 are intended to be driven from the junction box opening 13. As shown in FIG. 5, a stud attaching screw shoulder 17 for each of the stud attaching screws 10 is provided on the inner surface 40 of the left side 25 of the junction box 4. The stud attaching screw shoulders 17 are located to guide the stud attaching screws 10 at an angle of approximately 45 degrees from the plane of the left side 25 and are set at a location between the rear side 26 and the front edge of the junction box 4 which will both allow the stud attaching screws to be driven from the junction box opening 13 and allow an extension 44 of the junction box 4 beyond the front face 48 of the stud 5, which extension would normally not exceed one inch.

Also shown is a stud attaching screw washer 18 to assist in evenly spreading pressure from the stud attaching screw 10. Tin roof screws work fine.

Figure 6:
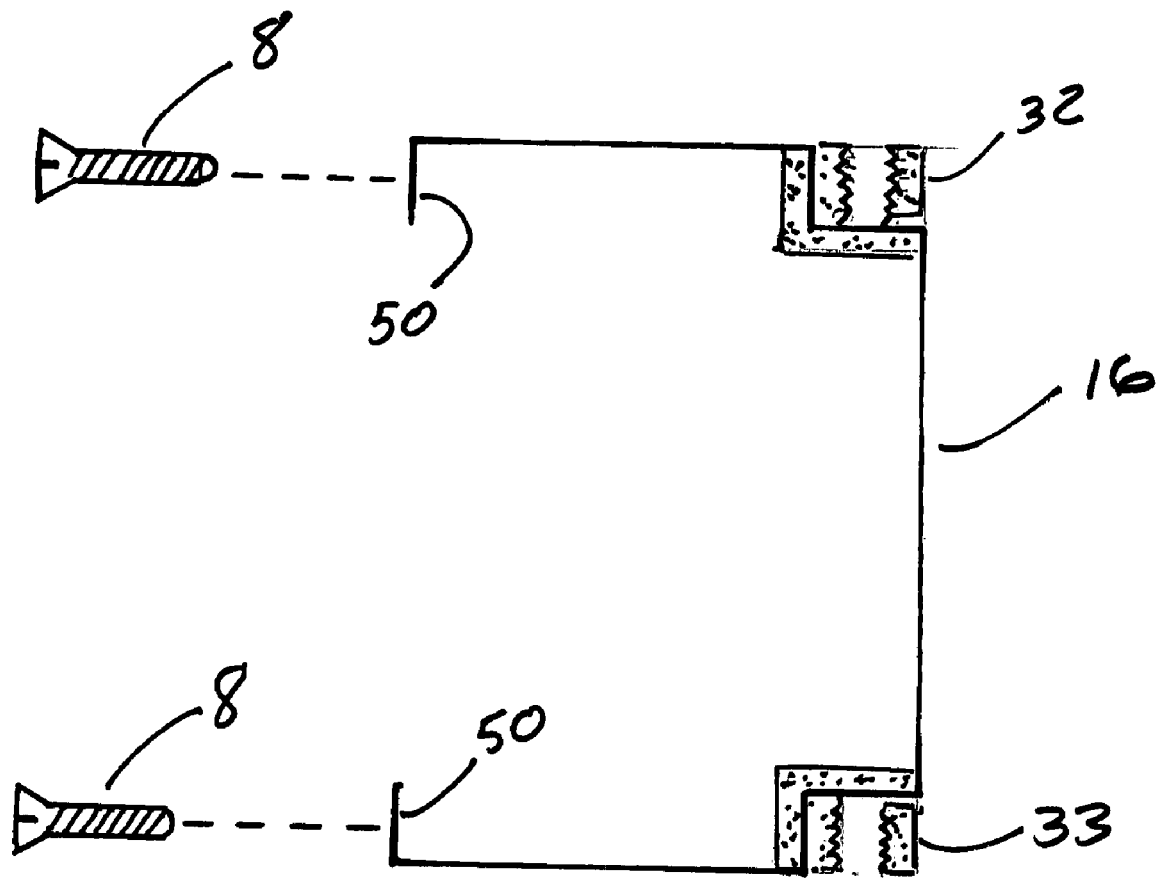
FIG. 6 is a side view of the ground strip.

FIG. 6 is a side view of the ground strip 16 which would normally be aligned between the two terminals 15 and shaped to fit into the junction box 4 with ground strip tabs 50 at the junction box opening, which tabs 50 also serve to receive the receptacle screws 8 for retention of the slide-in receptacle 3 in the junction box 4.

Figure 11:
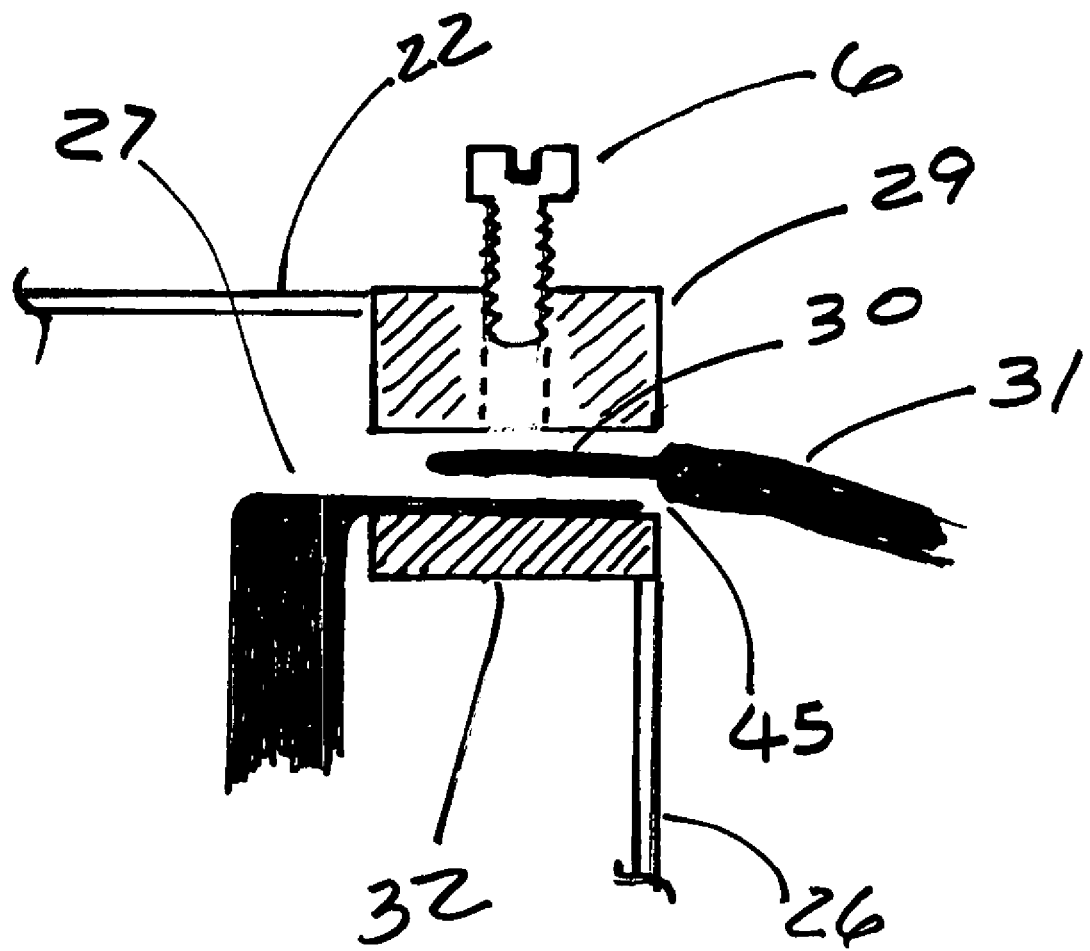
FIG. 11 is a side cross-sectional view of a retaining screw and wire.

Also shown in FIG. 6 is an upper non-conductive base 32 and a lower non-conductive base 33, both of which bases serve for placement of a retaining screw fitting 29 more fully described in FIG. 11 and as upper and lower mountings for the ground strip 16 as well as the terminal tabs 27 shown in FIG. 4. As noted above, it is intended that these non-conductive bases be in proximity to the rear side 26 of the junction box 4 where the rear side 26 meets the upper side 22 and the lower side 23 of the junction box 4.

Figure 7:
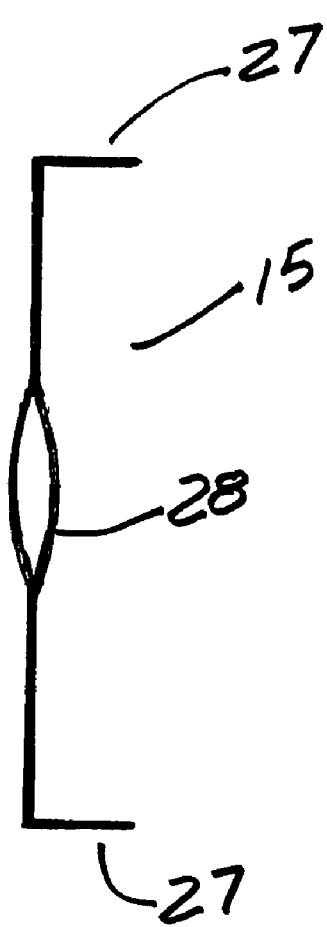
FIG. 7 is a front view of a terminal.

FIG. 7 shows a front view of a terminal 15 with terminal tabs 27 folded at a right angle on each end of the terminal 15. Also shown is a terminal slot aperture 28 intended to receive one of the elongated prongs 9 extending from the slide-in receptacle 3. The terminal slot aperture 28 may be created by using two conductive strips pressed together to form the terminal 15 with a slotted separation left in the middle portion of the terminal 15. Another configuration would be to use a longitudinally folded conductive strip crimped in the middle portion and cut to create a slotted aperture.

As noted above, it is intended that the terminal tabs 27 and the ground strip 16 be imbedded in an upper non-conductive base 32 and a lower non-conductive base 33, in proximity to the rear side 26 of the junction box 4 where the rear side 26 meets the upper side 22 and the lower side 23 of the junction box 4.

Figure 8:
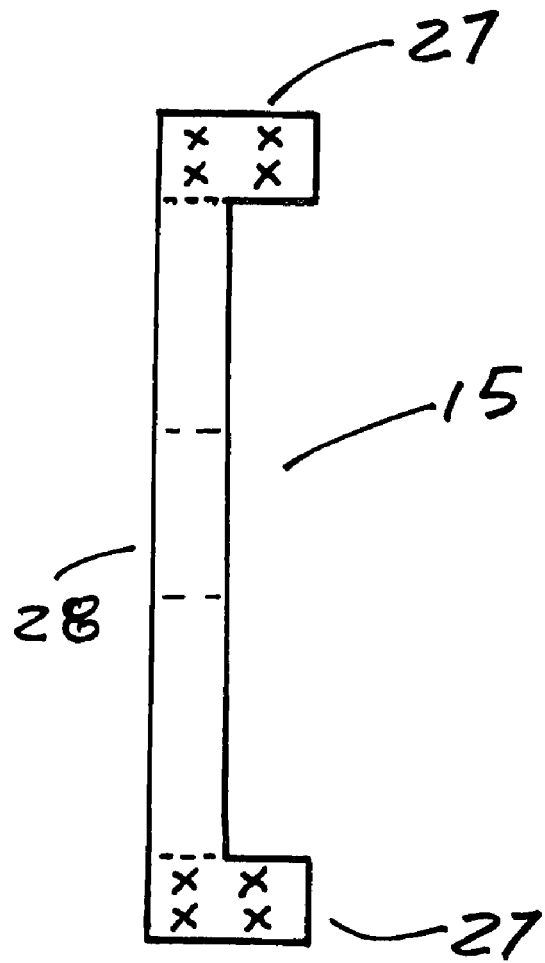
FIG. 8 is a side view of a terminal with top and bottom tabs unfolded.

FIG. 8 simply depicts a side view of a terminal 15 before the terminal tabs 27 are folded at a right angle. A side view of the terminal slot aperture 28 is also shown. In this depiction, the unfolded tabs are scored and it is intended that the tabs be folded to the same side of the terminal 15.

Figure 9:
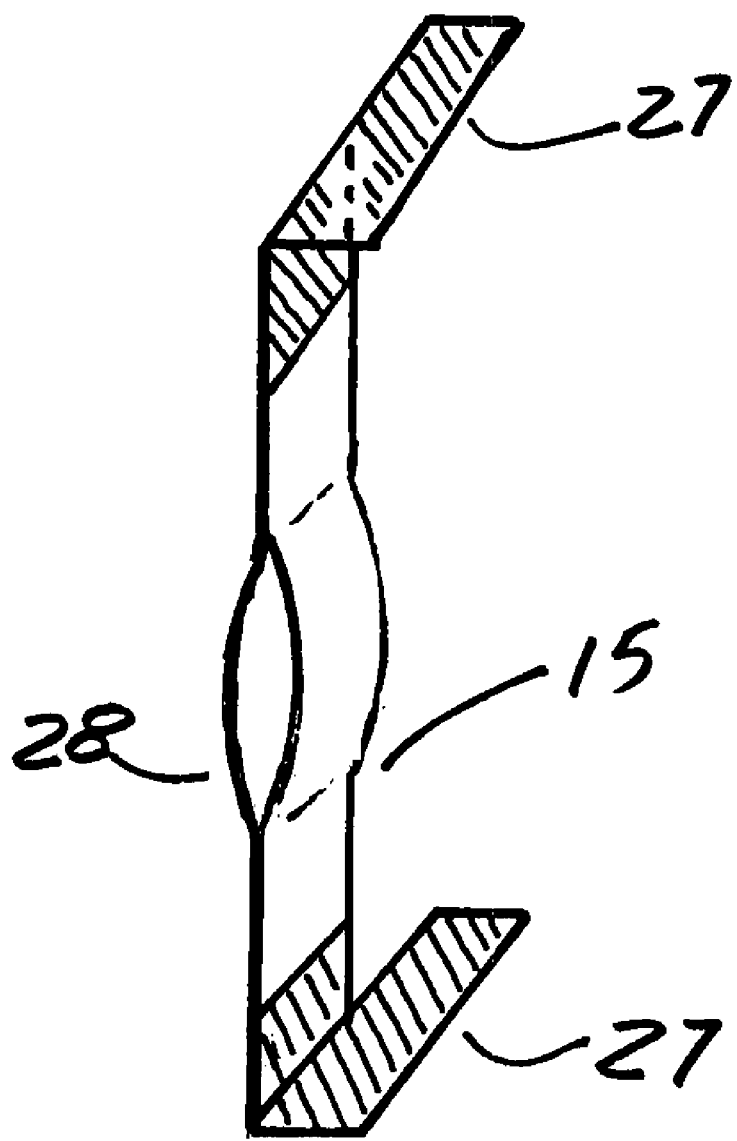
FIG. 9 is a perspective view of a terminal with top and bottom tabs folded.

FIG. 9 shows a perspective view of a typical terminal 15 with folded terminal tabs 27 and terminal slot aperture 28 intended to receive one of the elongated prongs 9 extending from the slide-in receptacle 3. The cross hatching indicates those portions of the terminal 15 which will be imbedded in an upper non-conductive base 32 and a lower non-conductive base 33, in proximity to the rear side 26 of the junction box 4 where the rear side 26 meets the upper side 22 and the lower side 23 of the junction box 4.

Figure 10:
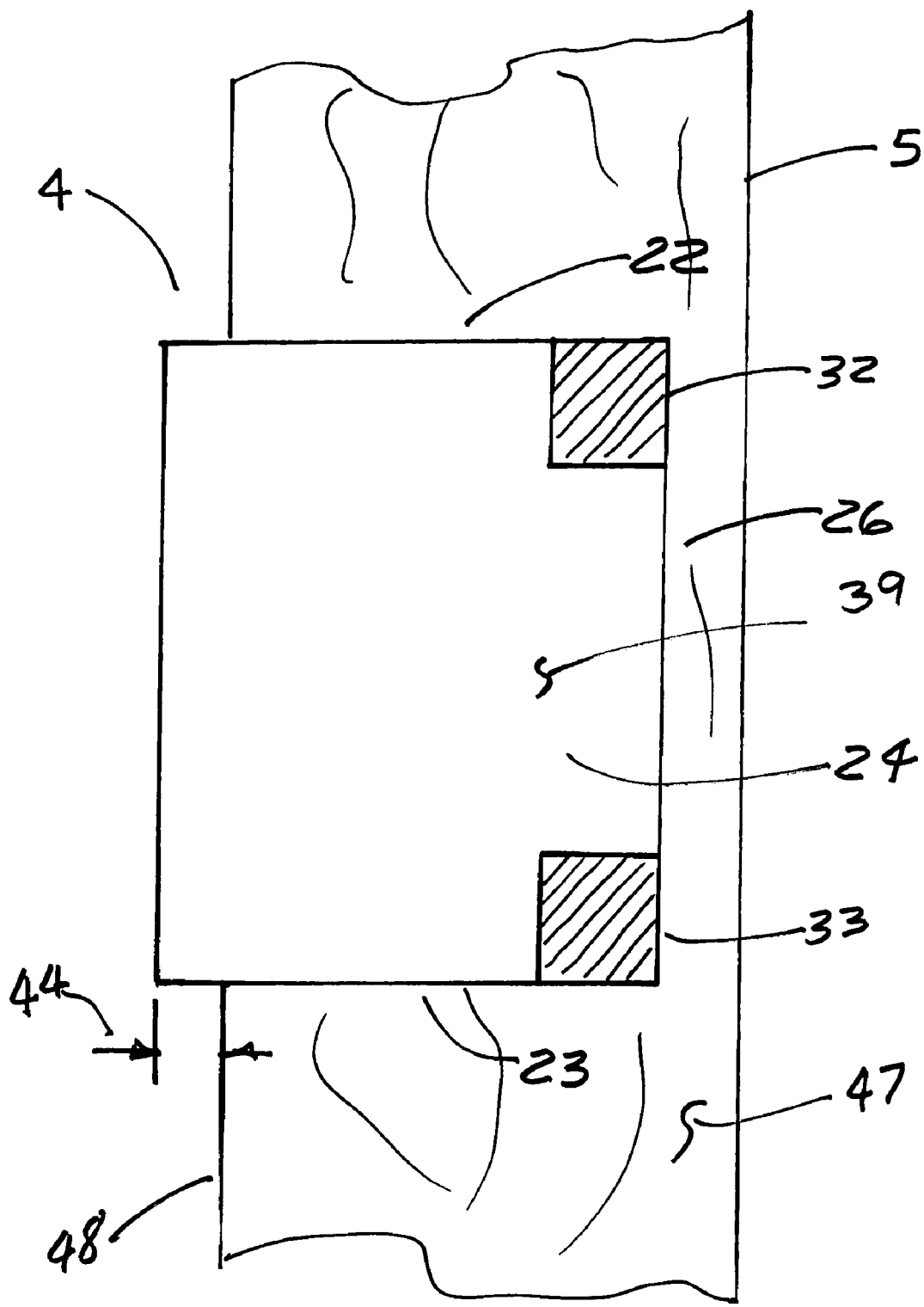
FIG. 10 is a side view of the inventive electrical junction box.

FIG. 10 is a side view of a junction box 4 mounted on the right side face 47 of a stud 5 by the use of two stud-retaining screws 10 driven from the junction box opening 13. Unlike junction boxes in common use today, the inventive junction box 4 has no "nail holders" for hammering the box onto the stud 5. Furthermore, the inventive junction box 4 has no "knock-out" plugs for insertion of cable, these plugs being replaced by more efficient retaining screws 6 and retaining screw fittings 29 as more fully shown in FIG. 11.

In FIG. 10 is depicted the outer surface 39 of the right side 24 of the junction box 4. The placement of the junction box 4 to provide an extension 44 beyond the front face 48 of the stud 5 is also shown.

The shaded portions at the intersection of the rear side 26 with the upper side 22 and the lower side 23 represent respectively the upper non-conductive base 32 and the lower non-conductive base 33 within the junction box 4, each base extending from the right side 24 to the left side 25. It is understood that the non-conductive bases 32 and 33 serve for placement of a retaining screw fitting 29 more fully described in FIG. 11 and as upper and lower mountings for the ground strip 16 as well as the terminal tabs 27 shown in FIG. 4.

It should be also noted that the junction box 4 shown in FIG. 10 could just as easily been mounted on the left side face 49 of the stud 5 by simply turning the junction box 4 over so that the stud attaching screws 10 and stud attaching screw shoulders 17 faced the left side face 49 of the stud 5. The components of the junction box 4 are symmetrical and the box can be used interchangeably on either side of the stud 5.

In FIG. 11 is depicted a cross section of a retaining screw fitting 29 placed in the upper non-conductive base 32 at the intersection of the rear side 26 and the upper side 22 of the junction box 4. While shown at the upper side 22, this arrangement is mirrored at the lower side 23. Likewise this arrangement is repeated for each terminal tab 27 and for the ground strip at both upper and lower ends.

In this arrangement, electrical contact is made by inserting a bare electrical wire 30, stripped of insulation 31 into a wire aperture 45 on the rear side 26 of the junction box 4. The retaining screw 6, on the upper side 22 or lower side 23 of the junction box 4, when rotated into the retaining screw fitting, causes contact between the bare electrical wire 30 and a terminal tab 27 or ground strip 16 embedded in the upper or lower non-conductive base, 32 or 33, as the case may be.

Figure 12:
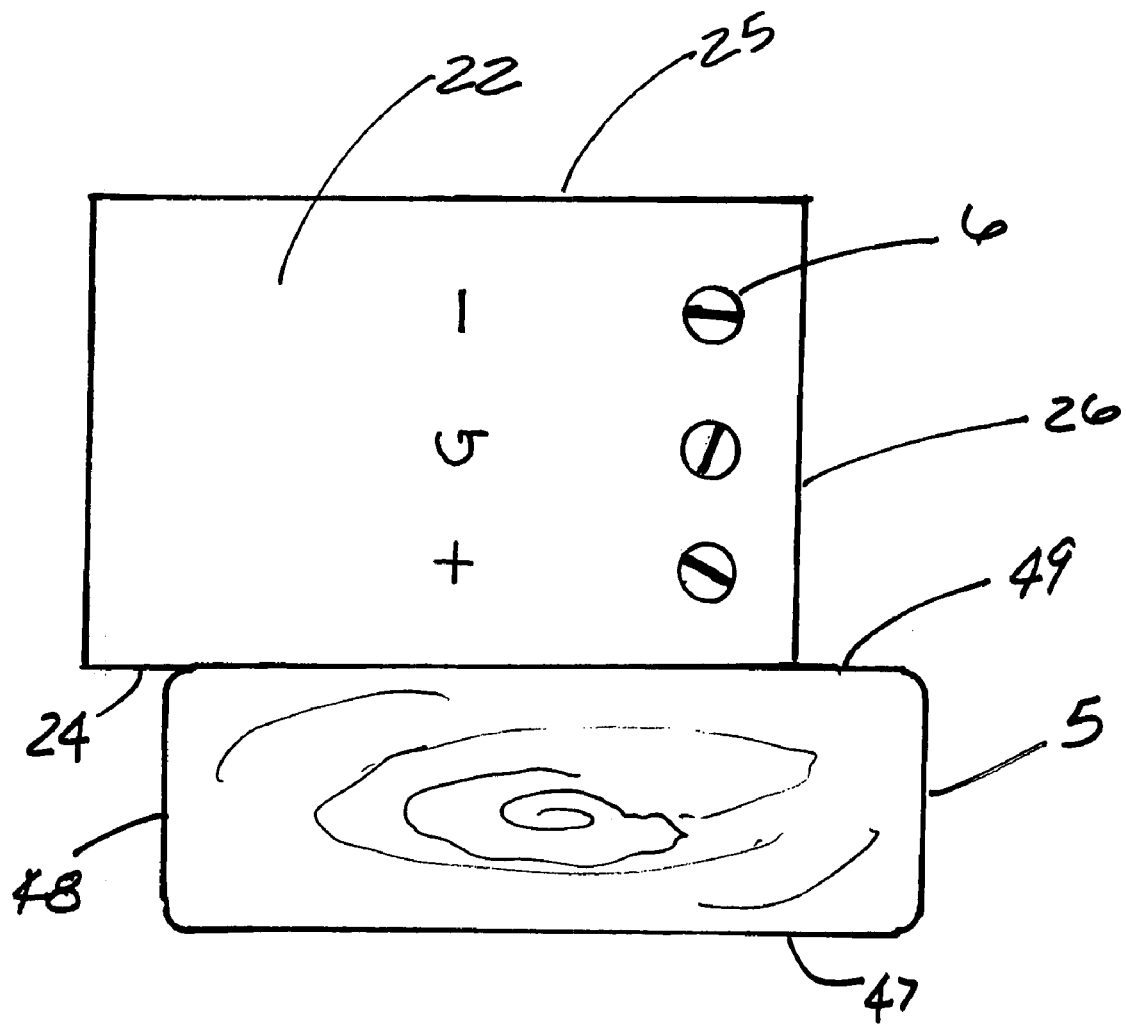
FIG. 12 is a top view of the inventive electrical junction box.
Figure 13:
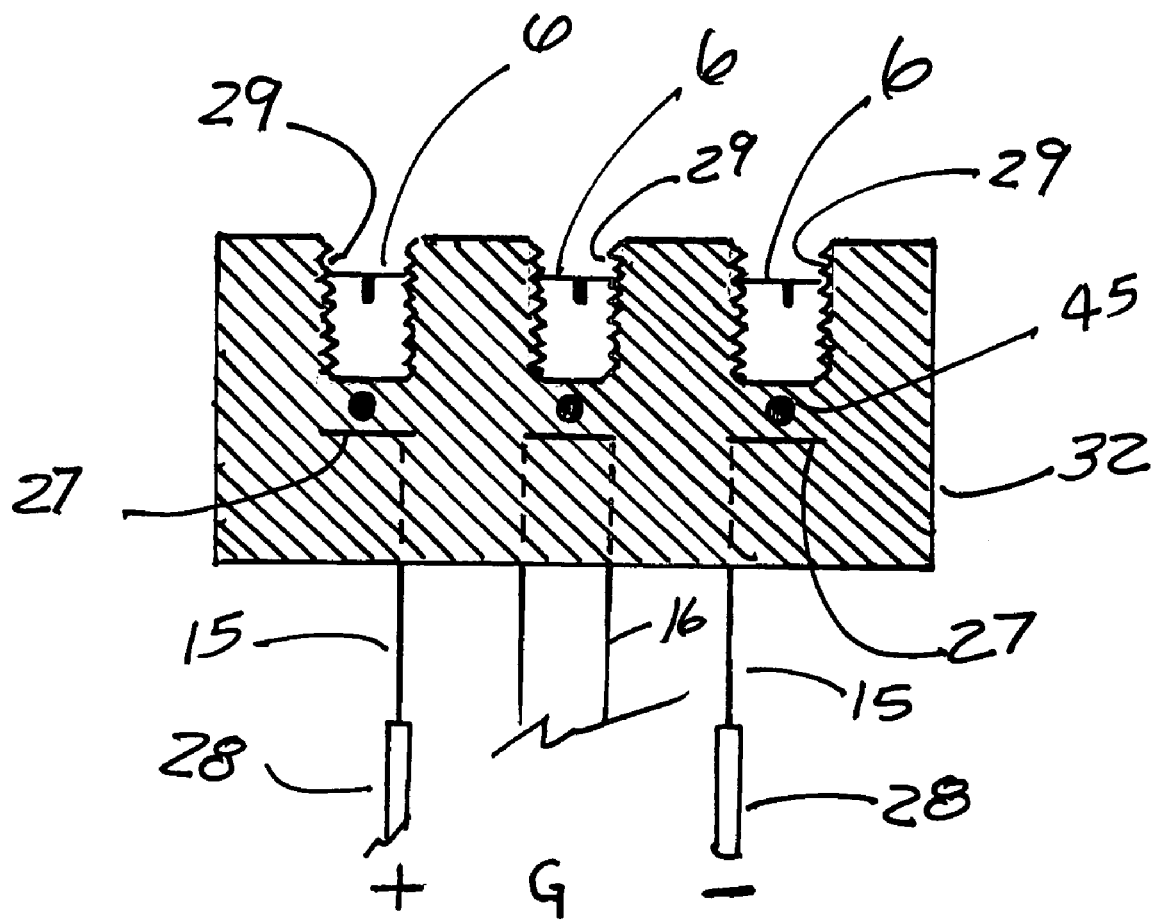
FIG. 13 is a rear cross sectional view of the retaining screw showing terminals and ground strip.

FIG. 12 shows a top view of a junction box 4 mounted on the left side face 49 of a stud 5. In this view the retaining screws 6 are shown on the upper side 22 of the junction box 4 with marking to indicate positive, ground and negative. The lower side 23 would be identical to the upper side 22, with retaining screws 6 and markings for positive, ground and negative. As apparent from the view and previous figures, the two outer retaining screws 6 are intended for connection to the terminal tabs 27 and the central retaining screw 6 connects to the ground strip 16. This is more fully illustrated in FIG. 13 which shows a rear cross sectional view of the retaining screw fittings 29 in the upper non-conductive base 32. In this section, the retaining screws 6 are shown in place in the retaining screw fittings 29 in the upper non-conductive base 32. The corresponding embedded terminal tabs 27 and ground strip 16 are also shown with polarity indications noted for the terminal tabs 27. Again, this view is mirrored at the lower side of the junction box 4. The retaining screws 6 can be headless slotted or Allen head or any kind of fine threaded screw.

Figure 14:
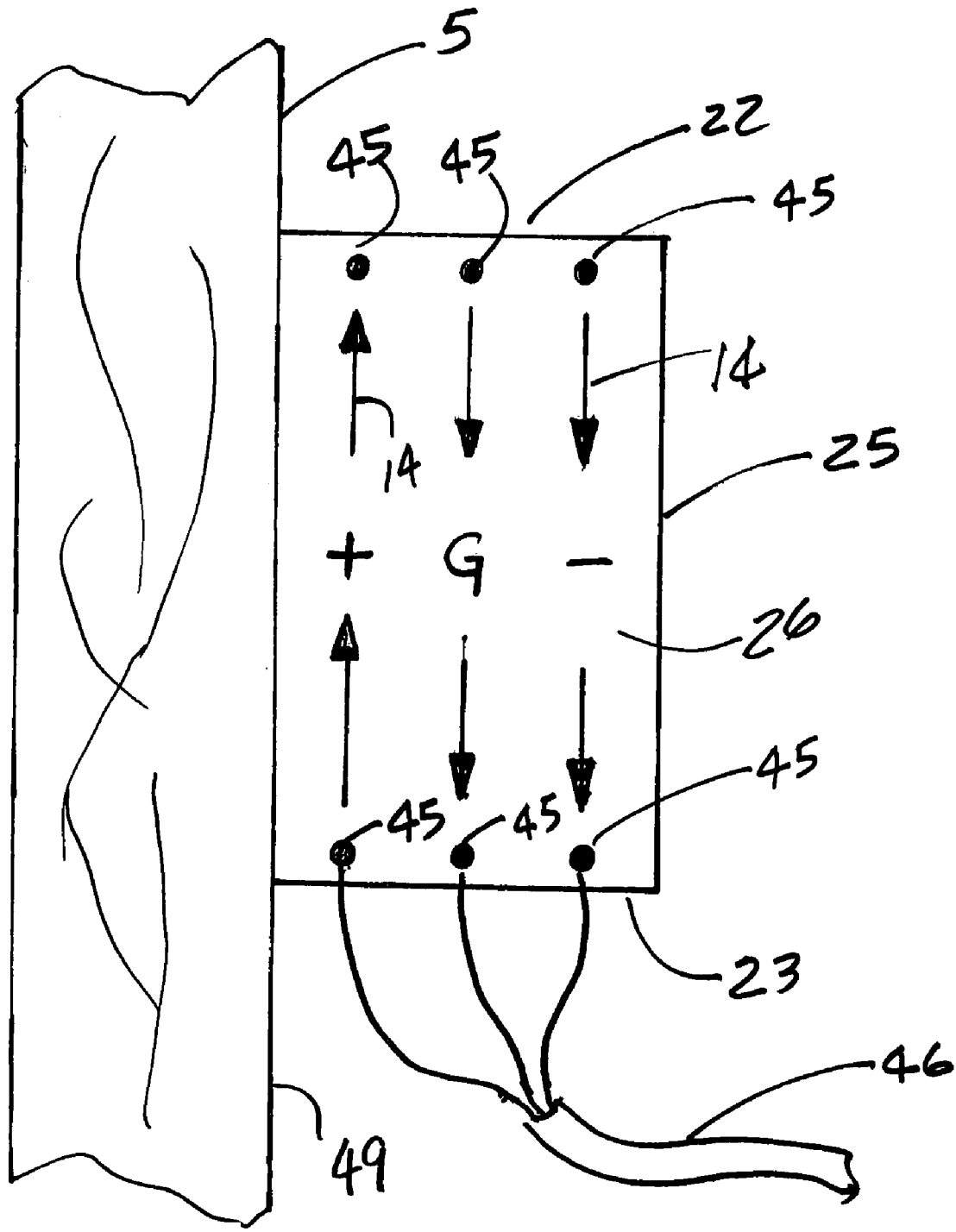
FIG. 14 is a rear view of the inventive electrical junction box.

FIG. 14 is a rear view of the junction box 4 mounted on the left side face 49 of a stud 5. In this view, upper and lower wire apertures 45 are shown on the rear side 26 of the junction box 4. Markings for positive, ground and negative are provided and current flow 14 is designated by arrows. Although not seen on FIG. 14 but shown on FIG. 12, on the upper side 22 and the lower side 23, retaining screws 6 are placed to correspond to the wire apertures 45.

In FIG. 14, the individual conductor wires of a power cable 46 provide electrical current to a junction box 4 are shown connected to the wire apertures at the lower side 26 of the junction box 4. If electrical current were to be provided to another junction box from this one, then the connections would simply be made at the wire apertures at the upper side 22 of the junction box 4 and the cable run to the next box.

Returning to installation, the classic way of installing junction boxes and receptacles, particularly on new construction, is to nail the junction box onto the stud, with the box protruding ½" to accommodate the dry wall. Then the wires are pulled through "knock out" plugs and squeezed back into the box until the sheetrock is in place. The electrician comes back, pulls the wires out, shapes and secures them on the sides of the receptacle, adjusts and screws the receptacle in place by simultaneously squeezing the wires back into the box.

If the receptacle needs to be replaced, it is necessary to start all over again, and this time with the power "OFF". At this point the wires have been shaped and squeezed back into the box three times, increasing the possibility of breakage or short.

In the present invention the wires on the receptacle have been replaced by elongated "prongs" which are flexible and take up for adjustments, save time for installation, plus being safer. All one has to do with the slide-in receptacle 3 is to remove the face plate 2 with one screw 7, undo the two receptacle screws 8, slide the old receptacle out, slide the new one in, and adjust it back in place.

The same holds true when you install sheetrock upon sheetrock, as sometimes happens. Even with power "ON". Now, when it comes to the box, the wires are first secured on it, then the box is aligned against the stud 5, the stud attaching screws 10 are tapped into the stud 5 to get a "bite" and then secured in place, all done at once. The wires now on the box, behind the wall, will probably never be touched again, which also makes the installation safer since there is no reshaping and bending, another reason why the wires are screwed onto the box.

The above procedure also holds true in the very unlikely event a junction box needs to be replaced. With power "OFF" the two attaching screws are driven out, the box would be slowly pulled out to provide access to the wires, which one might have to bend slightly; one by one the wires would be moved from the old box to the new and then the box would be put back in its original position, using the same stud attaching screws to secure it on the stud again. This is why the nails have been eliminated and replaced by the two attaching screws driven from inside the box.

If the above procedure had to be done in the classic way, one should have to break part of the wall for access to the box, replace it, tape, float, sand, prime, and paint the wall with all the mess, which translates into extra work, expense and time. The installation of inventive box can be done even with the sheetrock already in place.

The inventive electrical receptacle and junction box apparatus offers several distinct advantages including safety, ease of installation and removal and simplicity of manufacture. The inventive apparatus essentially requires only five metal parts including two identical prongs, two identical terminals and one ground strip.

I claim:

1. An electrical receptacle and box apparatus comprising:
    a.) a stud-mounted junction box with an opening defined by an upper side, a lower side, a left side, a right side, and a rear side, and stud attaching screw shoulders on the left or right side and accessible through said opening for mounting the junction box to a stud, having wire apertures on the rear side in proximity to the upper side and lower side for receiving electrical wiring without wrapping the wiring around screws;
    b.) a slide-in receptacle received in the junction box opening;
    c.) an electrical connection between the junction box and slide-in receptacle including rearward extending elongated prongs and terminals with slot apertures to allow the slide-in receptacle to move in and out of the junction box to compensate for variations in thickness of a wall attached to a stud and to allow for vertical adjustment.

2. The apparatus of claim 1 wherein the stud-mounted junction box further comprises:
    a.) retaining screws and retaining screw fittings on the upper and lower side in proximity to the rear side for each wire aperture;
    b.) a ground strip shaped to fit the junction box with upper and lower tabs at the opening of the junction box;
    d.) terminals with tabs and slot apertures;
    e.) upper and lower non-conductive bases for embedding the terminals tabs, the ground strip tabs and the retaining screw fittings.

3. The apparatus of claim 2 wherein the slide-in receptacle further comprises a socket face for screw attachment to the ground strip tabs and serving as a ground connection, with electrical plug apertures, rearward extending elongated prongs and a non-conductive base for embedding the elongated prongs.

4. The apparatus of claim 1 wherein the slide-in receptacle further comprises a socket face for screw attachment to the ground strip tabs and serving as a ground connection, with electrical plug apertures, rearward extending elongated prongs and a non-conductive base for embedding the elongated prongs.

5. An electrical receptacle and box apparatus comprising:
    a.) a stud-mounted junction box with an opening defined by an upper side, a lower side, a left side, a right side, and a rear side, and stud attaching screw shoulders on the left or right side and accessible through said opening for mounting the junction box to a stud, having wire apertures on the rear side in proximity to the upper side and lower side for receiving electrical wiring without wrapping the wiring around screws;
    b.) a slide-in switch received in the junction box opening;
    c.) an electrical connection between the junction box and slide-in switch including rearward extending elongated prongs and terminals with slot apertures to allow the slide-in switch to move in and out of the junction box to compensate for variations in thickness of a wall attached to a stud and to allow for vertical adjustment.

6. The apparatus of claim 5 wherein the stud-mounted junction box further comprises:
    a.) retaining screws and retaining screw fittings in proximity to the upper side and lower side for each wire aperture;
    b.) a ground strip shaped to fit the junction box with upper and lower tabs at the opening of the junction box;
    d.) terminals with tabs and slot apertures;
    e.) upper and lower non-conductive bases for embedding the terminal tabs, the ground strip tabs and the retaining screw fittings.

7. The apparatus of claim 6 wherein the slide-in switch further comprises a switch face for screw attachment to the ground strip tabs and serving as a ground connection, rearward extending elongated prongs and a non-conductive base for embedding the elongated prongs.

8. The apparatus of claim 5 wherein the slide-in switch further comprises a switch face for screw attachment to the ground strip tabs and serving as a ground connection, rearward extending elongated prongs and a non-conductive base for embedding the elongated prongs.

\* \* \* \* \*